United States Patent
Sharma (10) Patent No.: US 10,838,823 B2
(45) Date of Patent: Nov. 17, 2020

(54) SYSTEMS AND METHOD TO MAKE APPLICATION CONSISTENT VIRTUAL MACHINE BACKUP WORK IN PRIVATE NETWORK

(71) Applicant: EMC IP Holding Company LLC, Hopkinton, MA (US)

(72) Inventor: Anupam Sharma, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 318 days.

(21) Appl. No.: 15/886,714

(22) Filed: Feb. 1, 2018

(65) Prior Publication Data
US 2019/0235969 A1 Aug. 1, 2019

(51) Int. Cl.
*G06F 16/00* (2019.01)
*G06F 11/14* (2006.01)
*G06F 9/455* (2018.01)
*H04L 29/08* (2006.01)
*G06F 21/60* (2013.01)

(52) U.S. Cl.
CPC ...... *G06F 11/1464* (2013.01); *G06F 9/45558* (2013.01); *G06F 11/1469* (2013.01); *G06F 11/1474* (2013.01); *G06F 21/604* (2013.01); *H04L 67/1095* (2013.01); *H04L 67/28* (2013.01); *G06F 2009/45583* (2013.01); *G06F 2009/45595* (2013.01); *G06F 2201/84* (2013.01)

(58) Field of Classification Search
CPC ............ G06F 11/1464; G06F 11/1474; G06F 11/1469; G06F 9/45558; H04L 67/28; H04L 67/1095
See application file for complete search history.

(56) References Cited

U.S. PATENT DOCUMENTS

| | | | |
|---|---|---|---|
| 8,285,681 B2* | 10/2012 | Prahlad | G06F 3/0631 707/640 |
| 9,372,760 B1* | 6/2016 | Tsaur | H04L 69/40 |
| 9,658,925 B1* | 5/2017 | Damodharan | G06F 11/1458 |
| 9,710,338 B1* | 7/2017 | Kumar | G06F 11/1469 |
| 2012/0131323 A1* | 5/2012 | Gattegno | G06F 3/0617 713/2 |
| 2013/0085994 A1* | 4/2013 | Michael | G06F 11/1458 707/639 |

(Continued)

*Primary Examiner* — Tarek Chbouki
(74) *Attorney, Agent, or Firm* — Womble Bond Dickinson (US) LLP (57) ABSTRACT

A method for backing up application transaction data through a virtual backup proxy node is disclosed. The operations comprise: mounting an application transaction data disk image at the virtual backup proxy node with a Small Computer System Interface (SCSI) HotAdd method, the application transaction data disk image comprising application transaction data generated by an application running on a virtual machine, wherein the virtual machine is connected to a second network; and copying, by the virtual backup proxy node, the transaction data disk image to a storage device for backup protection through a first network to which the virtual backup proxy node and the storage device are connected, wherein no routable network path exists between the first network and the second network, or between the virtual machine and the storage device.

24 Claims, 4 Drawing Sheets

(56) References Cited

U.S. PATENT DOCUMENTS

| | | | |
|---|---|---|---|
| 2013/0262801 A1* | 10/2013 | Sancheti | G06F 3/065 |
| | | | 711/162 |
| 2014/0196038 A1* | 7/2014 | Kottomtharayil | G06F 9/505 |
| | | | 718/1 |
| 2015/0269029 A1* | 9/2015 | Smith | G06F 9/4406 |
| | | | 714/15 |
| 2019/0163578 A1* | 5/2019 | Anami | G06F 11/1451 |

* cited by examiner

SYSTEMS AND METHOD TO MAKE APPLICATION CONSISTENT VIRTUAL MACHINE BACKUP WORK IN PRIVATE NETWORK

FIELD OF THE INVENTION

Embodiments of the disclosure are related to electronic devices, and more particularly, to a method, apparatus, and system for backing up application transaction data in virtual machines with a virtual proxy node.

BACKGROUND

In a conventional server virtualization environment (e.g., VMware vSphere), application consistent data protection works as follows: With image level backup and recovery, the data protection application installs an agent within the virtual machine, which backs up and recovers transaction data (e.g., transaction logs, changes, etc.) of an application running on the virtual machine. The agent first captures the transaction data locally on the virtual machine, and then transfers it over the network to a storage apparatus (e.g., Dell EMC Data Domain Backup Appliance). For this to work, the storage apparatus needs to be accessible through the network to which the virtual machine is connected.

In cases where the virtual machines have access only to a private network (i.e., a network that is not publicly routable and through which the storage apparatus is not accessible), the conventional approach described above becomes problematic because the agent on the virtual machine cannot connect to the storage device through the private network, and therefore transferring of the transaction data to the storage device becomes impossible.

Therefore, in such cases, in order for the application transaction data to be properly backed up to the storage device, special care needs to be taken to make sure the storage device is accessible through a network from the virtual machine infrastructure. If the virtual machine is behind a firewall, ports may need to be opened on the firewall for the application transaction data protection to work. Customers may find such special measures difficult to implement in a production environment.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to a method, apparatus, and system for backing up application transaction data through a virtual backup proxy node. The operations may comprise: mounting an application transaction data disk image with a HotAdd method at a virtual backup proxy node, the application transaction data disk image comprising application transaction data generated by an application running on a virtual machine; and copying the application transaction data disk image to a storage device for backup protection through a public network.

Figure 1:
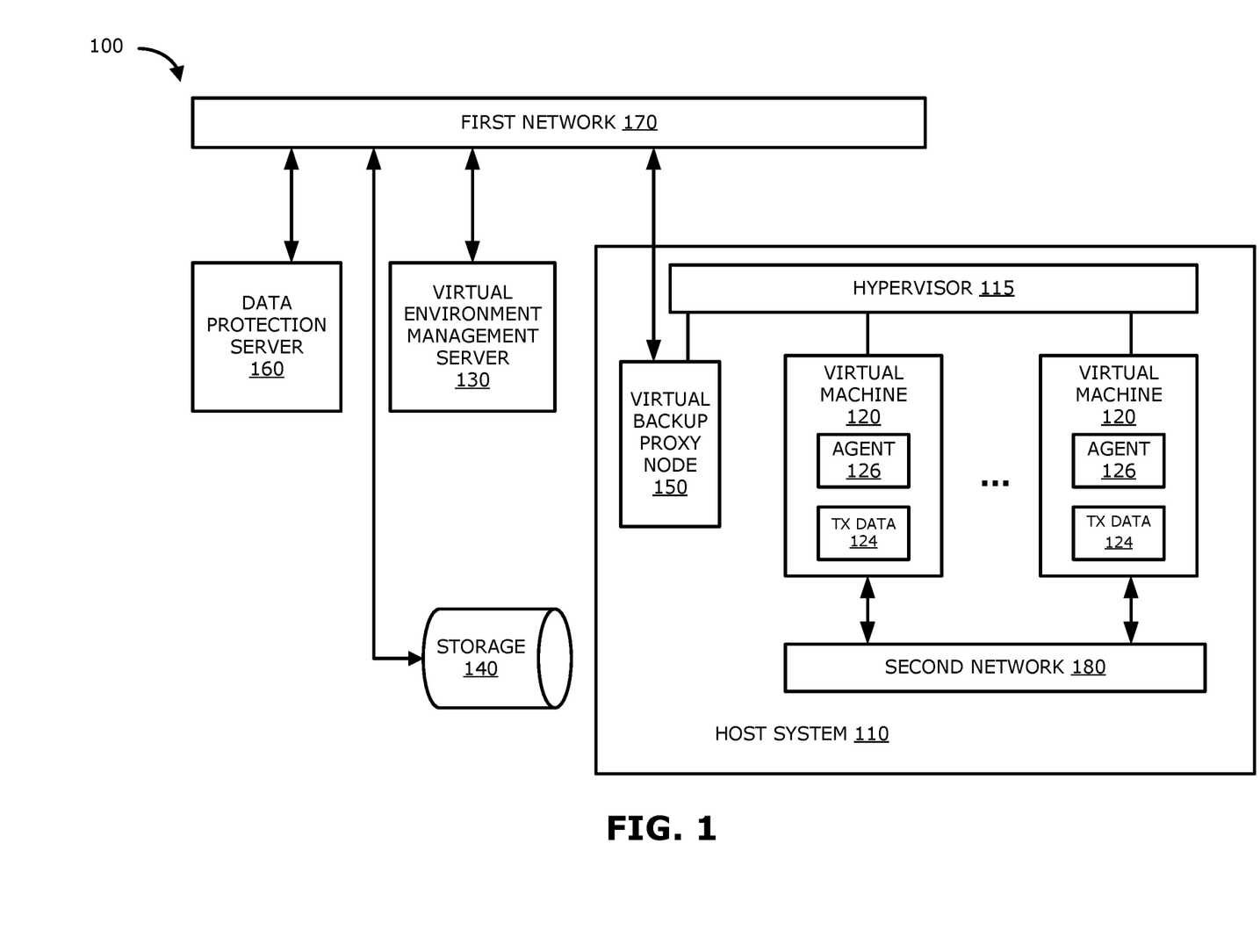
FIG. 1 is a block diagram illustrating an example environment in which embodiments of the disclosure may be practiced.

Referring to FIG. 1, a block diagram illustrating an example environment 100 in which embodiments of the disclosure may be practiced is shown. A hardware host system 110 may host one or more virtual machines 120 with the assistance of a hypervisor (e.g., VMware ESXi) 115. The hypervisor 115 may be managed by a virtual environment management server (e.g., VMware vCenter) 130. Further, the virtual machines 120 may have access to a second network 180. One or more of the virtual machines 120 may each host one or more applications that generate application transaction data 124 during runtime. An application agent 126 may run on each virtual machine 120 that contains application transaction data 124 that requires protection through backups. The application agent 126 may perform transaction data backup and recovery operations; in particular, it may collect transaction data 124 into a transaction data 124 disk image, and attempt to back the transaction data 124 up to a storage device 140. The transaction data 120 disk image may be separate from the main system disk image of the virtual machine 120.

The host system 110 may further host a virtual backup proxy node 150. The virtual backup proxy node 150 may, under the coordination of the virtual environment management server 130 and a data protection server 160, back up disk images of the virtual machines 120 to the storage device 140. The virtual backup proxy node 150 may also perform recovery operations by restoring the backed up disk images from the storage device 140 to the host system 110 for access by virtual machines 120. The virtual backup proxy node 150 may access disk images of the virtual machines 120 through such methods as Network Block Device (NBD), Small Computer System Interface (SCSI) HotAdd (hereinafter "HotAdd"), etc., as provided by the hypervisor 115. It should be appreciated that the hypervisor 115, virtual backup proxy node 150, virtual environment management server 130, data protection server 160, and the storage device 140 may have access to a common, first network 170 (e.g., a public network), through which they may communicate with each other. Therefore, under the coordination of the virtual environment management server 130 and the data protection server 160, the virtual backup proxy node 150 may back up the disk images of the virtual machines 120 by copying the disk images to the storage device 140 through the first network 170.

Therefore, it should be appreciated that if the second network 180 is also a public network like the first network 170 (i.e., data is routable between the second network 180 and the first network 170), the application agent 126 may successfully transfer copies of the transaction data 124 to the storage device 140 for backup protection through the second network 180 and the first network 170. However, if the second network 180 is a private network (i.e., data is not routable between the second network 180 and the first network 170), the application agent 126 will not be able to transfer copies of the transaction data 124 to the storage device 140 because no routable network path exists between the virtual machines 120 and the storage device 140.

Figure 2:
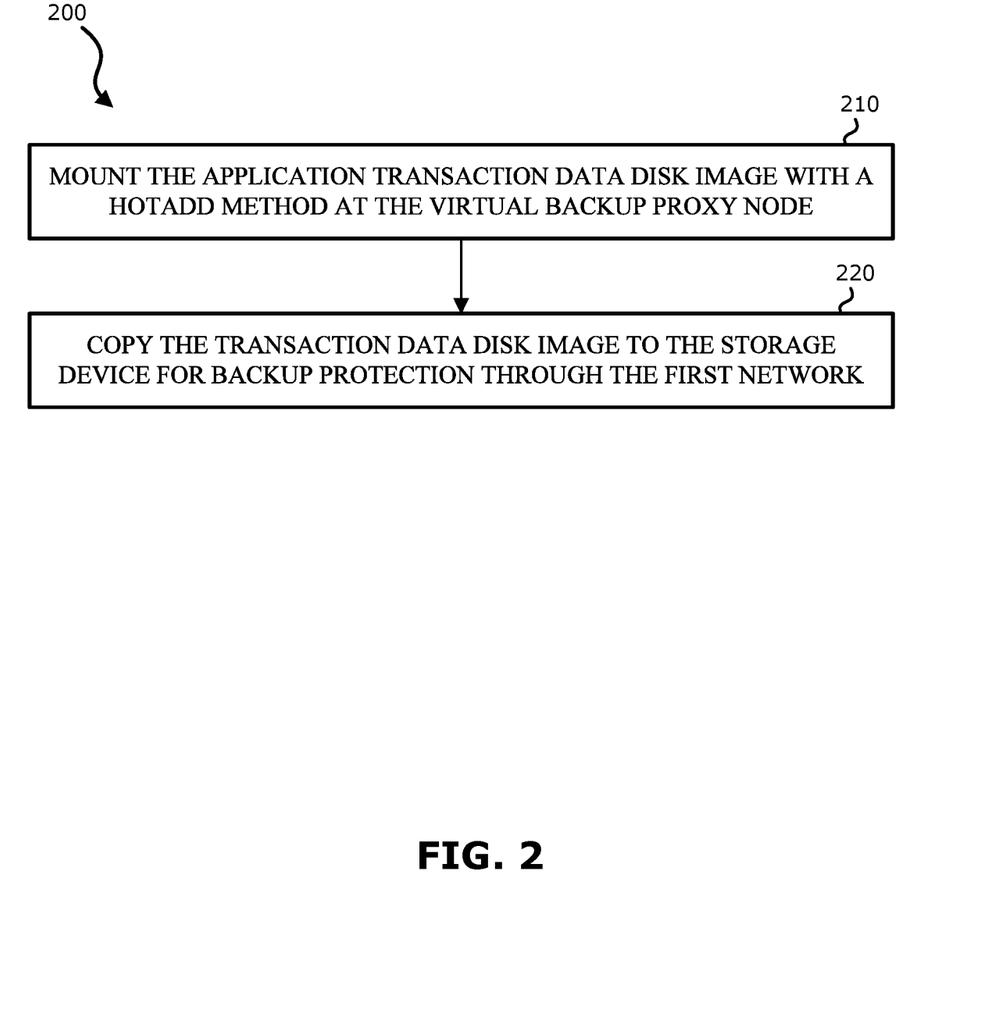
FIG. 2 is a flowchart illustrating an example method for backing up application transaction data through a virtual backup proxy node, according to one embodiment of the disclosure.
Figure 3:
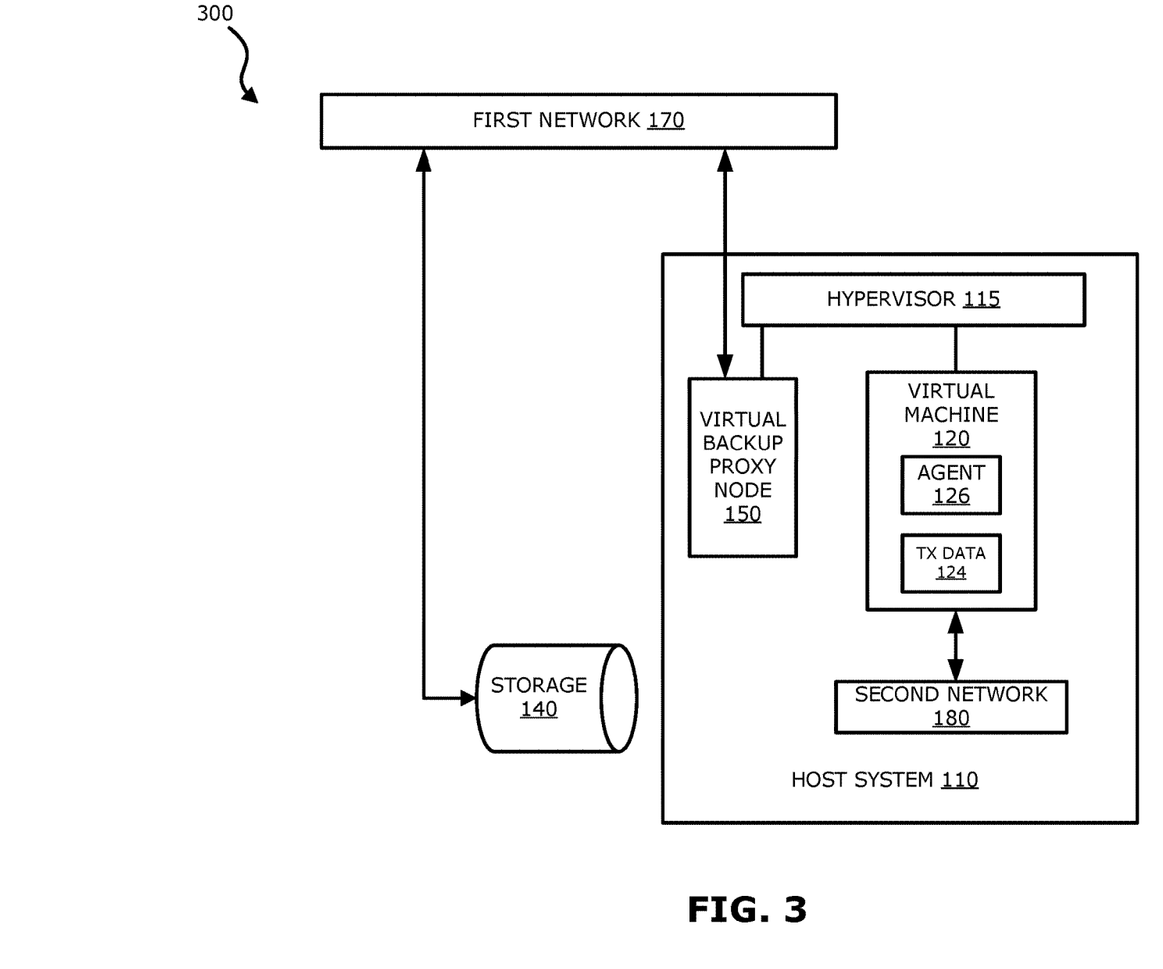
FIG. 3 is a block diagram illustrating various components involved in the method 200, according to one embodiment of the disclosure.

Referring to FIG. 2, a flowchart illustrating an example method 200 for backing up application transaction data through a virtual backup proxy node, according to one embodiment of the disclosure, is shown. Referring further to FIG. 3, a block diagram 300 illustrating various components involved in the method 200, according to one embodiment of the disclosure, is shown.

At block 210, the virtual backup proxy node 150 may mount the application transaction data 124 disk image with a HotAdd method, the application transaction data 124 disk image comprising application transaction data 124 generated by an application running on a virtual machine 120. A person skilled in the art would understand that mounting the transaction data 124 disk image at the virtual backup proxy node 150 with HotAdd is enabled by the hypervisor 115, and does not rely on the existence of a routable network path between the virtual machine 120 and the virtual backup proxy node 150. Therefore, even if the second network 180 to which the virtual machine 120 is connected is a private network, and no routable network path exists between the second network 180 and the first network 170, the virtual backup proxy node 150 is still capable of mounting the transaction data 124 disk image.

At block 220, the virtual backup proxy node 150 may copy the transaction data 124 disk image to the storage device 140 for backup protection through the first network 170 (e.g., a public network). It should be appreciated that the virtual backup proxy node 150 may also mount the main system disk image of the virtual machine 120 and back it up to the storage device 140. Furthermore, when needed, the virtual backup proxy node 150 may perform recovery operations. In particular, the virtual backup proxy node 150 may retrieve a backed up copy of the transaction data 124 disk image from the storage device 140, and restore the copy to the system 110 so that it is accessible in the virtual machine 120.

Method 200 may be performed by processing logic that includes hardware (e.g. circuitry, dedicated logic, etc.), software (e.g., embodied on a non-transitory computer readable medium), or a combination thereof. For example, method 200 may be performed by processors 1501 of FIG. 4. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the disclosure enable application consistent data protection in a virtualization environment where the virtual machines on which applications run and application transaction data is generated do not have access to a public network. The already-existent virtual backup proxy node is leveraged to mount the application transaction data disk image with HotAdd and back the image up to a storage device through a public network to which the virtual backup proxy node does have access. The embodiments would function even if no routable network path exists between the network to which the virtual machine has access and the public network. Therefore, difficulties associated with ensuring the existence of a routable network path between the network to which the virtual machine is connected and the network to which the storage device is connected so that the conventional application consistent data protection approaches may work can be avoided.

Figure 4:
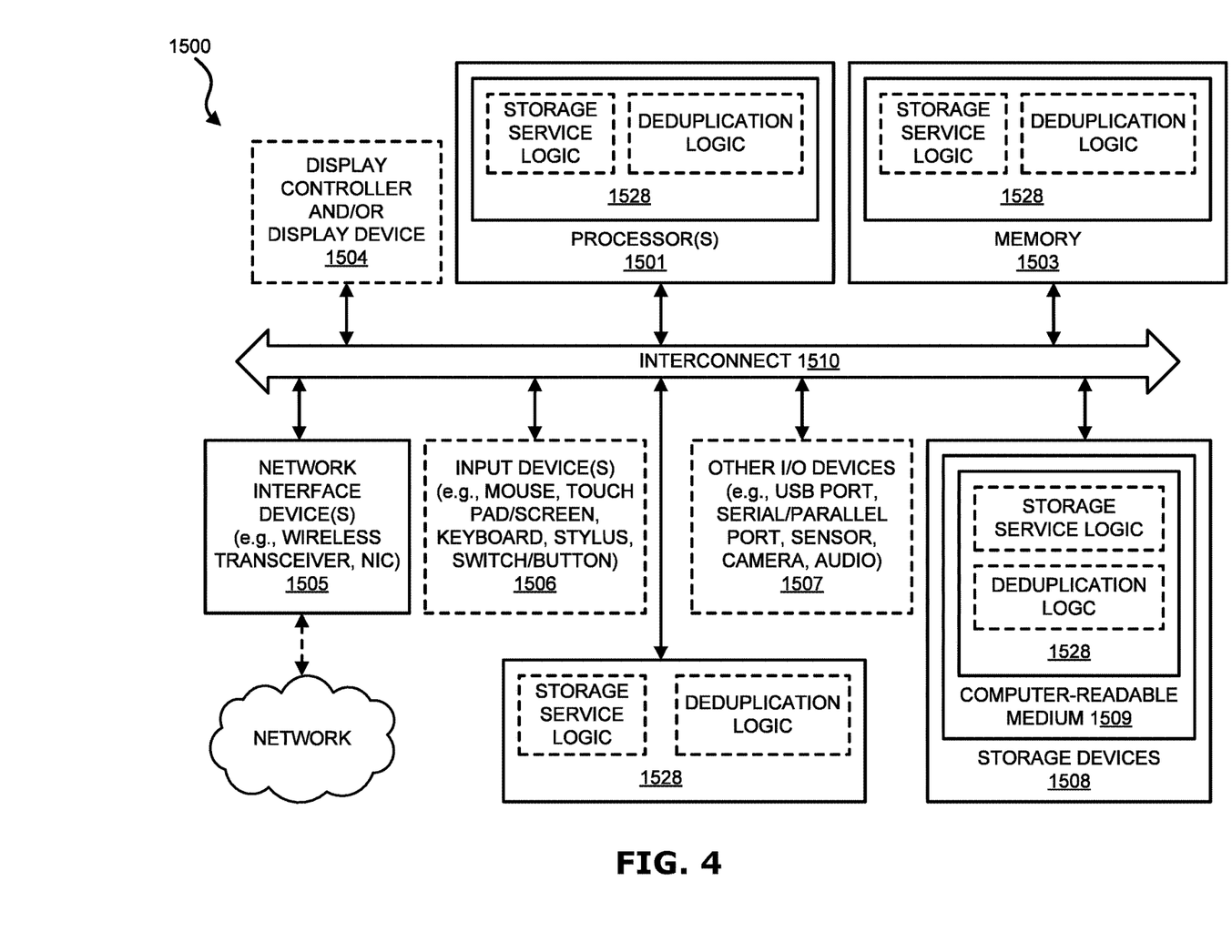
FIG. 4 is a block diagram illustrating an example of a data processing system which may be used with one embodiment of the disclosure.

FIG. 4 is a block diagram illustrating an example of a data processing system 1500 which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other 10 devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for backing up application transaction data through a virtual backup proxy node, comprising:
    mounting an application transaction data disk image at the virtual backup proxy node with a Small Computer System Interface (SCSI) HotAdd method, the application transaction data disk image comprising application transaction data generated by an application running on a virtual machine, wherein the virtual machine is connected to a second network; and
    copying, by the virtual backup proxy node, the transaction data disk image to a storage device for backup protection through a first network to which the virtual backup proxy node and the storage device are connected, wherein no routable network path exists between the first network and the second network, or between the virtual machine and the storage device.

2. The method of claim 1, wherein the virtual backup proxy node and the virtual machine reside on a hypervisor on a hardware host system.

3. The method of claim 2, wherein the hypervisor is managed by a virtual environment management server.

4. The method of claim 2, further comprising retrieving a copy of the transaction data disk image from the storage device through the first network and restoring the copy of the transaction data disk image to the hardware host system.

5. The method of claim 1, wherein the first network is a public network.

6. The method of claim 1, wherein the second network is a private network.

7. The method of claim 1, wherein the backing up of the application transaction data is coordinated by a data protection server.

8. The method of claim 1, wherein the application transaction data disk image is separate from a system disk image of the virtual machine.

9. A non-transitory machine-readable medium having instructions stored therein which, when executed by a processor, cause the processor to perform backup operations, the operations comprising:
    mounting an application transaction data disk image at the virtual backup proxy node with a Small Computer System Interface (SCSI) HotAdd method, the application transaction data disk image comprising application transaction data generated by an application running on a virtual machine, wherein the virtual machine is connected to a second network; and
    copying the transaction data disk image to a storage device for backup protection through a first network to which the virtual backup proxy node and the storage device are connected, wherein no routable network path exists between the first network and the second network, or between the virtual machine and the storage device.

10. The non-transitory machine-readable medium of claim 9, wherein the virtual backup proxy node and the virtual machine reside on a hypervisor on a hardware host system.

11. The non-transitory machine-readable medium of claim 10, wherein the hypervisor is managed by a virtual environment management server.

12. The non-transitory machine-readable medium of claim 10, the operations further comprising retrieving a copy of the transaction data disk image from the storage device through the first network and restoring the copy of the transaction data disk image to the hardware host system.

13. The non-transitory machine-readable medium of claim 9, wherein the first network is a public network.

14. The non-transitory machine-readable medium of claim 9, wherein the second network is a private network.

15. The non-transitory machine-readable medium of claim 9, wherein the backing up of the application transaction data is coordinated by a data protection server.

16. The non-transitory machine-readable medium of claim 9, wherein the application transaction data disk image is separate from a system disk image of the virtual machine.

17. A data processing system, comprising:
a processor; and
a memory coupled to the processor storing instructions which, when executed by the processor, cause the processor to perform backup operations, the operations including:
mounting an application transaction data disk image at the virtual backup proxy node with a Small Computer System Interface (SCSI) HotAdd method, the application transaction data disk image comprising application transaction data generated by an application running on a virtual machine, wherein the virtual machine is connected to a second network; and
copying the transaction data disk image to a storage device for backup protection through a first network to which the virtual backup proxy node and the storage device are connected, wherein no routable network path exists between the first network and the second network, or between the virtual machine and the storage device.

18. The data processing system of claim 17, wherein the virtual backup proxy node and the virtual machine reside on a hypervisor on a hardware host system.

19. The data processing system of claim 18, wherein the hypervisor is managed by a virtual environment management server.

20. The data processing system of claim 18, the operations further comprising retrieving a copy of the transaction data disk image from the storage device through the first network and restoring the copy of the transaction data disk image to the hardware host system.

21. The data processing system of claim 17, wherein the first network is a public network.

22. The data processing system of claim 17, wherein the second network is a private network.

23. The data processing system of claim 17, wherein the backing up of the application transaction data is coordinated by a data protection server.

24. The data processing system of claim 17, wherein the application transaction data disk image is separate from a system disk image of the virtual machine.

\* \* \* \* \*